J. L. SIMMONS.
COIN CONTROLLED APPARATUS.
APPLICATION FILED NOV. 13, 1907.

906,571.

Patented Dec. 15, 1908.
4 SHEETS—SHEET 1.

Witnesses
Edwin L. Bradford

Inventor
Jas. Lee Simmons
Wm. O. Dyre
Attorney

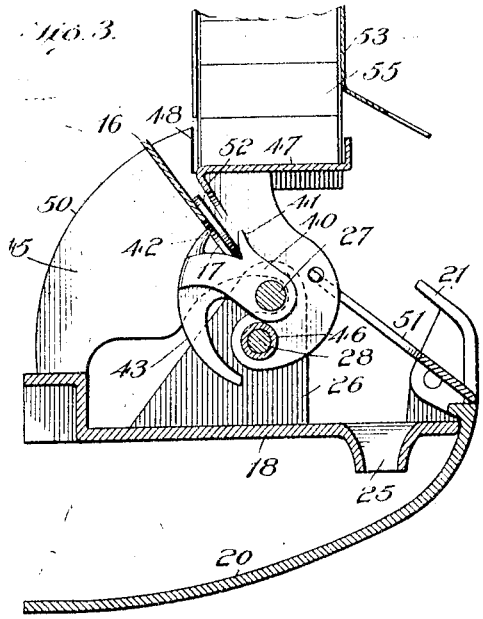
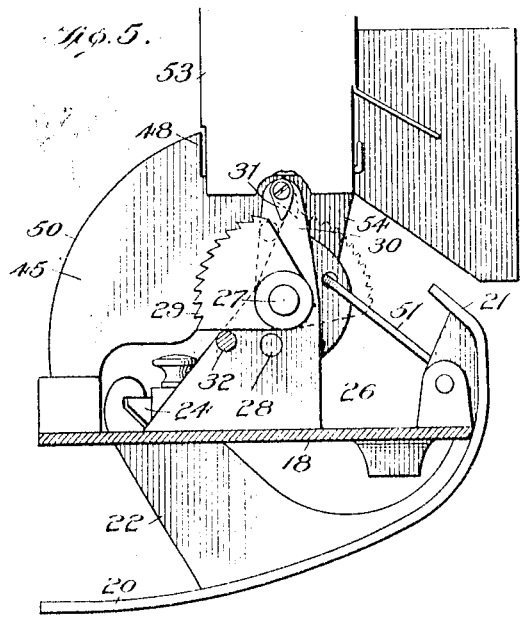
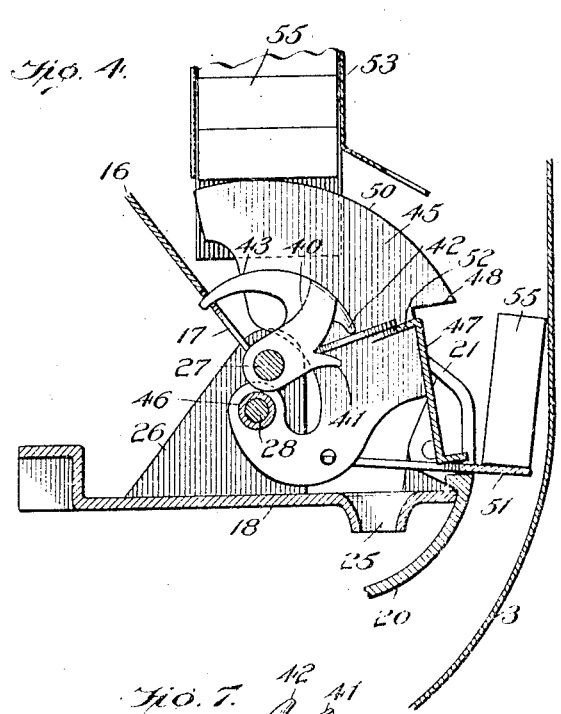
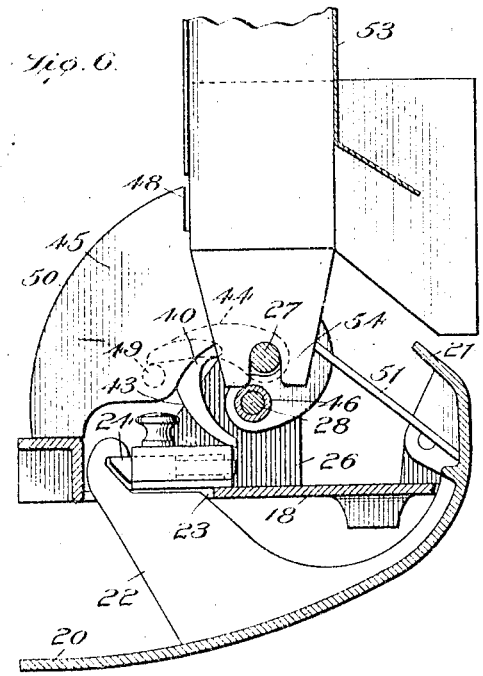
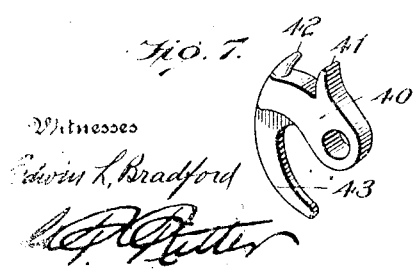

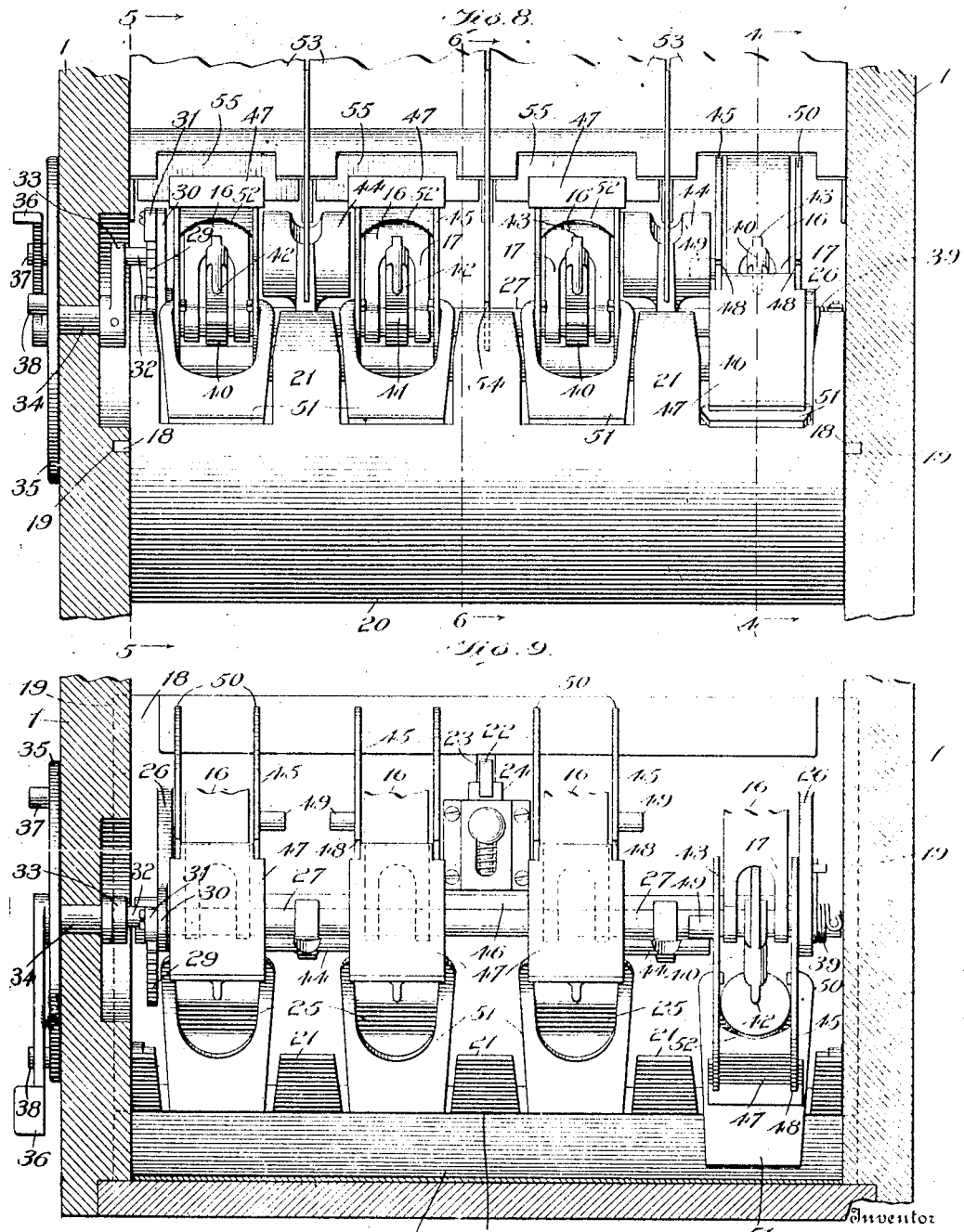

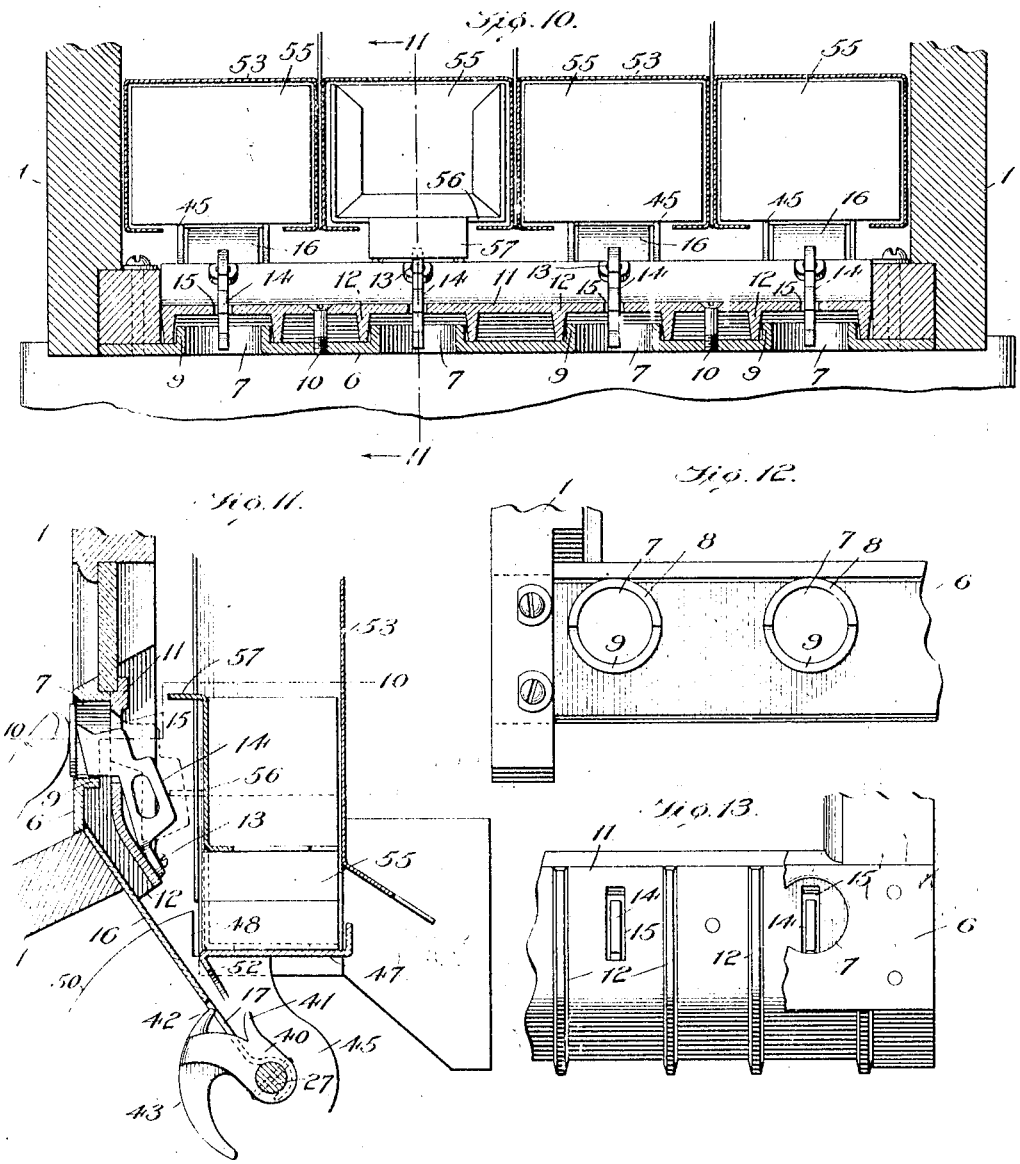

UNITED STATES PATENT OFFICE.

JAMES LEE SIMMONS, OF WASHINGTON, DISTRICT OF COLUMBIA, ASSIGNOR OF ONE-HALF TO A. A. BIRNEY AND ONE-HALF TO A. J. SCHIPPERT, BOTH OF WASHINGTON, DISTRICT OF COLUMBIA.

COIN-CONTROLLED APPARATUS.

No. 906,571.

Specification of Letters Patent.

Patented Dec. 15, 1908.

Application filed November 13, 1907. Serial No. 402,011.

*To all whom it may concern:*

Be it known that I, JAMES LEE SIMMONS, a citizen of the United States, residing at Washington, in the District of Columbia, have invented certain new and useful Improvements in Coin-Controlled Apparatus; and I do hereby declare the following to be a full, clear, and exact description of the invention, such as will enable others skilled in the art to which it appertains to make and use the same.

My invention relates to check controlled means for automatically actuating article-delivery mechanism; to the combination of such means and delivery mechanism in a vending machine; and to certain features of construction and arrangement of parts whereby the elements aforesaid coöperate to deliver articles or packages of merchandise upon the deposit of a check or coin of the proper size and denomination.

More particularly stated, the invention comprises in a vending machine, suitable means for introducing a coin of proper denomination, a combined coin-driving and fraud-preventing element of the turning or oscillatory type, a coin-driven element of the same type, and an article delivery-device or devices so combined and arranged that a coin of the proper denomination will serve as a connector between said driving and driven elements to render the said delivery device or devices operative.

The objects of my invention are those common to coin-controlled vending machines in general, but in addition it is my object to accomplish such results in a more efficient and practical manner than heretofore and by apparatus and devices of improved and simplified form.

The invention will be hereinafter described and particularly pointed out in the claims to follow.

Figure 1:
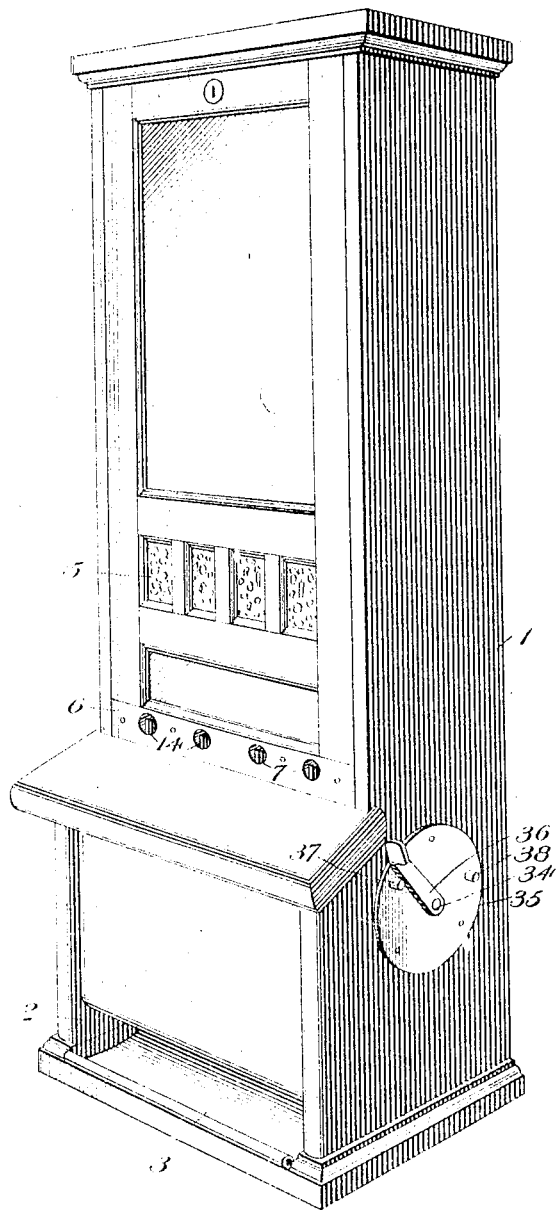
Figure 2:
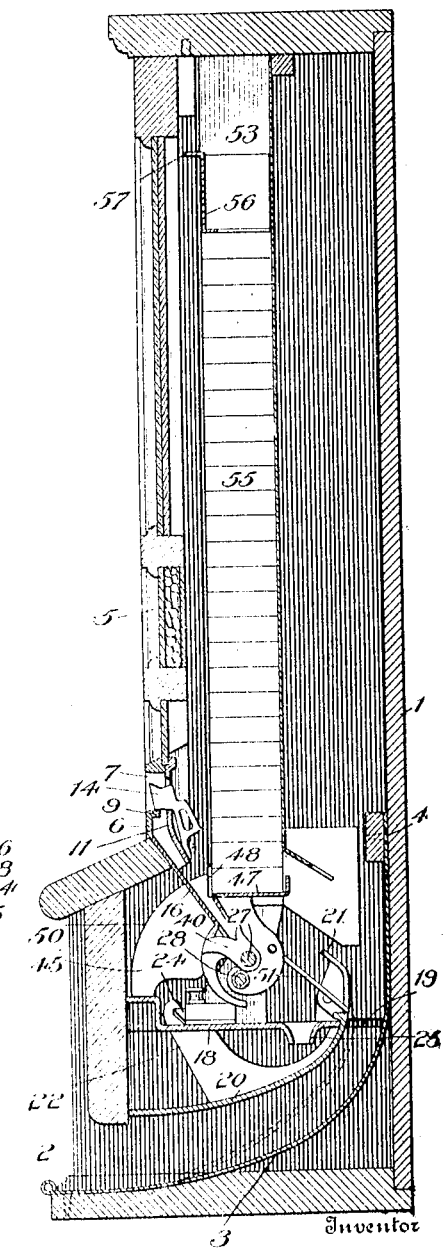

In the accompanying drawings which form part of this application, and whereon like numerals indicate corresponding parts in the several views: Figure 1 is a perspective view representing my invention in its entirety. Fig. 2 is a vertical cross section through the machine case and contents. Fig. 3 is also a vertical section, through the coin-controlled and the article-delivery devices in normal position. Fig. 4 is a vertical section on the line 4—4 of Fig. 8, the instant before final delivery of the article and deposit of the coin. Fig. 5 is a vertical section on the line 5—5 of Fig. 8, showing parts in normal position. Fig. 6 is also a vertical section through moving parts in normal position, taken on line 6—6 of Fig. 8. Fig. 7 is a perspective view of the coin-driving and fraud-preventing element. Fig. 8 is a rear elevation of the operative parts of my invention with back of the case removed and its sides in vertical section. Fig. 9 is a plan view of parts shown by Fig. 8, the right hand delivery devices or ejector having been operated. Fig. 10 is a horizontal section through the case-front on the zigzag line 10—10 of Fig. 11. Fig. 11 is an enlarged vertical section through the case-front and adjacent parts on the line 11—11 Fig. 10. Fig. 12 is a fragmentary view showing in elevation the inner face of the coin receiving front-plate. Fig. 13 is also a fragmentary view, showing in elevation the front face of the coin receiving plate, and a back plate to which it is connected. Figs. 14 and 15 are corresponding detached views of the coin-driving device in side elevation and a fragment of the article-delivery carriage in section, both figures showing in section an improper check, the former a washer and the latter a thin disk.

Reference being had to the drawings and numerals thereon, 1 indicates the vending machine case which in the present illustrations is represented as a rectangular structure having a transverse opening 2 at its base lined by a transversely fitting curved guiding-plate 3 affixed to the case-back as at 4 for assisting in the delivery of articles when properly ejected from the machine.

In the front of case 1 are openings properly guarded by transparent closures 5 for displaying the character of the goods in stock, and beneath is a face-plate 6 broken by coin receiving apertures 7 corresponding in size with a proper coin. In the present illustrations there are four such display openings and four coin receiving apertures shown, but obviously the number is wholly within the discretion of the manufacturer. On the reverse or inner surface of said plate 6 its apertures 7 are each surrounded by an annular boss 8 having the lower half cut away as at 9, and to the said face plate 6 is detachably secured as by screws 10 a back-plate 11 having forwardly projecting ribs 12 which latter bear against and offset the plate 6 as best shown by Fig. 10. Thus it is apparent that the proper circumference of a coin is determined by the circumferential measurement of the apertures 7, and its proper thickness by the depth of the lower cut-away or reduced portion 9 of the annular bosses 8 through both of which such coin must pass before reaching the actuating mechanism.

Near its lower edge the back plate 11 is curved or angled, as best shown by Figs. 11 and 2, and to same at points in vertical alinement with the center of apertures 7 are loosely secured, as by screws 13, upwardly rising and forwardly inclined dogs 14, which, passing through slots 15 in the said back-plate 11 gravitate to the normal position indicated by full lines in Fig. 11. From such normal position, however, said dogs are readily thrown back to the position indicated in dotted lines on said Fig. 11 by the introduction of a proper coin at all times except when they should be locked against such hinge-movement to positively prevent the introduction of a coin, that is to say, when the stock of goods to which a particular dog 14 belongs has been exhausted, at such times the dog is automatically locked in its forward or normal position in a manner that will hereinafter appear.

From the lower edge of face-plate 6, between same and the inner angular edge of back plate 11 is a transversely arranged inwardly-extending guide-plate 16 having downwardly projecting individual branches 17 for directing proper coins to their operative positions, or in other words to positions where they are to serve as connectors between the driving and driven elements of the apparatus now to be described.

The numeral 18 indicates a base-plate or main support for the moving parts of the structure. It is by preference of rectangular form and of a width slightly greater than that of the machine case 1 between its opposite sides, and these two sides are gained out or grooved horizontally as at 19 to receive and support said base plate in its operative position. To the rear of said base 18 is hinged a forwardly curved money receptacle 20 having upstanding cam fingers 21 which assist in ejecting the purchased articles or packages, as will appear in a description of operation to follow, while near the longitudinal center said base is provided with an integral upstanding notched dog or latch member 22, which, passing through a surface slot 23 in said plate 18 is there engaged and normally retained by a spring latch 24 in the position indicated by Figs. 2, 5 and 6. Near its rear edge this base 18 is further broken by coin slots 25 intermediate of the cam-like fingers 21 aforesaid, there being one slot 25 for each set of coin controlled actuating devices, the present illustrations showing four. Rising from opposite ends of base 18 are integral lugs 26 in which are supported a rock-shaft 27, and beneath this a fixed shaft 28 upon which the driving and driven devices are respectively mounted. These devices are arranged in sets one for each of the apertures 7 into which the controlling coins are originally introduced, and such sets of devices are counterparts one of the other, arranged and adapted to be operated simultaneously or dissimultaneously according to the number of proper coins deposited.

Keyed upon one end of rock-shaft 27 just outside of lug 26 is a segmental rack 29 above which upon an extension 30 of said lug 26 is a small gravity pawl 31, as best shown by Fig. 5; while beneath one edge of the rack 29 is the wrist pin 32 of a crank 33 secured to or forming part of a stub-shaft 34 projecting through and loosely journaled in the side of the case 1, as also a surface plate 35 affixed thereto, as shown by Fig. 8. To said stub shaft 34 is attached in like manner an actuating lever 36 and the sweep of the latter is limited in both directions by pins 37 and 38 projecting from said plate 35. At its opposite end the shaft 27 is surrounded by a return spring 39 one end thereof being secured to said shaft and the other anchored upon its adjacent lug 26, for the purpose of returning the shaft and correlative parts to their normal positions indicated by Figs. 1, 2, 3 and 5.

Mounted rigidly upon the rock shaft 27, in direct alinement with the individual branches 17 of guide-plate 16, are the oscillatory coin driving elements 40, each having a coin support 41, a driving spur 42, and a rearwardly extending segmental tail 43 centered upon said shaft 27; while at points on said shaft intermediate of said elements 40 are affixed in like manner, spurs 44 the purposes whereof are to return to normal position the coin driven elements now to be described. Mounted loosely upon the fixed shaft 28 are the driven elements of the structure each comprising an oscillatory carriage 45 formed of two corresponding sides which straddle the driving elements 40 aforesaid and are properly spaced upon their common shaft 28 by small sections of tubing 46, while the top of each of said driven carriages is fitted with a flanged horizontal support 47 for the lowermost of a stack of packages or boxes containing the goods to be delivered. Immediately forward of said horizontal supports 47 the sides of carriages 45 project upward a distance approximating the depth of the boxes or articles in the stacks for delivery, and such projections 48 constitute the ejectors; while projecting laterally from adjacent sides of the first and second, the third and fourth of said carriages are pins 49 directly in the path of the spurs 44 aforesaid, by agency whereof the carriages are returned to their normal position after each delivery. Forward of the ejectors 48 the sides of carriages 45 present segmental edges as at 50 centered upon shaft 28, and back of said shaft each carriage is fitted with a loosely journaled slide 51 adapted to be projected between its particular pair of the hereinbefore mentioned cam-fingers 21 with each oscillatory movement of the carriage for purposes that will be set forth in the description of operation to follow. Between the two sides of each of the driven carriages 45 at points immediately beneath ejectors 48 there is a web 52 having a rounded upper edge, radially arranged with reference to its supporting shaft 28, and so spaced with reference to the driving member 40, that a proper coin when normally supported by the latter barely overlaps said upper rounded edge. Thus it will be observed that normally disconnected driving and driven elements mounted upon different centers are adapted to be operatively connected by a proper coin, and to be turned or oscillated in eccentric paths whereby said elements are caused to radially approach and then recede from each other during each delivery oscillation, to automatically deposit the coin in the money receptacle and thereupon deliver a purchased article or package from the machine.

Surmounting the aforesaid coin controlled driving, driven, and delivery devices a series of vertical stacks 53 one for each set of said devices, which may be connected or disconnected and supported in the towering portion of case 1 in any approved manner, the present illustrations showing a series of four parallel connected stacks having at two points downwardly projecting bifurcated feet 54 which straddle and are supported by the main rock-shaft 27, as best shown by Fig. 6. Within these stacks 52 are arranged the goods, articles or packages 55 to be sold, and in each stack above such packages is located a follower 56 of rectangular form, one of which is shown in plan by Fig. 10 and one in section by Fig. 11, having a forwardly projecting flange 57 adapted, when the stack is exhausted to impinge upon the back of dogs 14 as indicated by dotted lines in Fig. 11 to close its coin aperture 7. And it will be noted that the oscillatory driving member or element 40 centered upon its supporting shaft 27, as shown in the present illustrations, is of substantially segmental form, that its coin-support 41 is radially and its driving spur 42 circumferentially arranged, and that intermediate of said coin-support and spur is a working edge or surface herein termed an advance surface, which is depressed with relation to the plane occupied by a proper coin initially, that is to say, when interposed between the driving and driven elements as indicated by Fig. 3.

The foregoing being a description of my invention in its preferred form of construction the use and operation, briefly stated, is as follows:

A proper coin having been introduced sidewise into one of the receiving apertures 7 and the particular guide plate 16 and the particular branch 17, to one of the driving members 40 by which it is received in the position indicated by Fig. 3 of the drawings, where it is to serve as a connector between said driving and the driven elements of the mechanism. A sweep of the actuating lever 36 now causes a partial rotation of shaft 27 and with it all of the coin-carrying members 40, but obviously only those which have been operatively connected with the driven members or delivering devices, by interposition of the coin as aforesaid are effective.

The web 52 which has been engaged by the extreme upper portion of the coin now serves as an abutment and is advanced or oscillated upon shaft 28 as its center of rotation, taking with it all integral parts of the structure. During this movement it will be noted that the driving and the driven elements 40 and 45 respectively, are moving eccentrically so that the connecting coin in its passage from the position indicated by Fig. 3 to that indicated by Fig. 4, is first elevated, thus taking a firmer hold upon the abutment 52, and then gradually depressed to the point where the two eccentric paths cross, where it is thrown out and said parts are again disconnected.

During the movement last described the ejector 48 engaging the front edge of a box or article 55 serves to advance same from its original position, the balance of the column in stack 53 in the meantime being supported upon the segmental upper edges of the carriage 45, and the slide 51 being projected to the position shown by Fig. 4. Upon nearing the completion of its movement, the cam-fingers 21 serve to obstruct the passage of said box 55 and crowd same over the flanged end of its support 47, whereupon it is deposited upon the projected slide 51, and there remains until after the coin has been discharged through its slot 25 into the money receptacle 20 beneath base 18.

The driven carriage 45 having served its purpose is now returned to its normal position by agency of recoil spring 39, shaft 27, spur 44, and one of the pins 49 projecting from the side of said carriage, and, slide 51 being thus withdrawn, the box in question falls and is conducted to the front of the machine by agency of the curved guiding plate 3. Thus the process may be repeated until the last box of any stack has been withdrawn, but when this occurs the follower 56 descending to the position indicated by dotted lines in Fig. 11, presents its flange 57 to the back edge of dog 14 and locks same in its forward position to positively prevent the introduction of a coin after the stock has been exhausted.

The initial movement of the driving element 40 aforesaid, is effected by agency of the wrist-pin 32 under control of lever 36, said pin bearing upward beneath the rack 29 (Fig. 5), and, it will be observed, that once started a completion of the stroke is rendered compulsory before there can be a retrograde movement, by the engagement of pawl 31 acting as a detent, thus rendering it impossible to repeat the delivery with a single coin. If, however, before the completion of a stroke or advance movement of the driving and driven elements, a second coin is prematurely introduced, same is arrested upon the guide-plate 16 by the extended tail 43 of the coin-carrying and driving element 40, and there retained until normal conditions are restored, whereupon, if a proper coin, it will gravitate into operative position. If, however, the coin or check is improper the said driving member 40 serves as a fraud preventing device as follows: If too small in diameter such coin fails to engage the abutment or web 52; if of proper diameter but too thin it settles further into the driving member 40 as shown by Fig. 15; and if a washer of proper diameter and size to enter the machine originally, it is impaled upon the driving spur 42 as shown by Fig. 14 where it reclines upon the depressed advance of said driving member 40, and in each of the several examples cited the spurious coin check or washer fails to engage the abutment 52 and consequently to interlock the driving and driven parts, but on the contrary is carried forward and deposited without results.

When it is desired to empty the money receptacle 20 this is speedily and effectually accomplished by merely unlocking and removing the front of case 1, whereupon latch 24 may be withdrawn, thus allowing the bottom of said receptacle to assume the position indicated by dotted lines in Fig. 2, and delivering all coins into the transverse opening 2 at the bottom of case 1, at the same point where the purchased goods are at other times delivered.

This being a description of my invention its preferred form of construction, use and operation, it should be understood that various structural changes and alterations can and will be made without departing from the spirit of the invention, which will now be set forth in the following claims:

1. In a coin controlled apparatus having oscillatory driving and driven elements constructed and arranged to be operatively connected by the interposition of a proper coin, means whereby said elements are caused to radially approach and then recede from each other during each delivery oscillation.

2. In a coin controlled apparatus having oscillatory driving and driven elements constructed and arranged to be operatively connected by the interposition of a proper coin, means whereby said elements moving upon different centers are caused to radially approach and then recede from each other during each delivery oscillation.

3. In a coin controlled apparatus having oscillatory driving and driven elements constructed and arranged to be operatively connected by the interposition of a proper coin, independent pivotal supports for said elements, and means whereby said elements are caused to radially approach and recede from each other during each delivery oscillation.

4. In a coin controlled apparatus having oscillatory driving and driven elements constructed and arranged to be operatively connected by the interposition of a proper coin, independent shafts in fixed relation upon which said elements are mounted, and means whereby said elements are caused to radially approach and recede from each other during each delivery oscillation.

5. In a coin controlled apparatus, oscillatory driving and driven elements, the former having a coin support, a driving spur, and an advance surface depressed with relation to the plane occupied by a proper coin initially.

6. In a coin controlled apparatus, oscillatory driving and driven elements, the former having a coin support, a driving spur, and an advance surface depressed with relation to the plane occupied by a proper coin when in operative position.

7. In a coin controlled apparatus, oscillatory driving and driven elements, the former having a coin support, a driving spur, and an advance surface depressed with relation to the plane occupied by a proper coin when interposed between said driving and driven elements.

8. In a coin controlled apparatus, oscillatory driving and driven elements, the former having a coin support, a circumferential driving spur, and an advance surface depressed with relation to the plane occupied by a proper coin initially.

9. In a coin controlled apparatus, oscillatory driving and driven elements, the former having a coin support, a driving spur, an advance surface depressed with relation to the plane occupied by a proper coin initially, and a trailing segmental tail.

10. In a coin controlled apparatus, oscillatory driving and driven elements, the former having a coin support, a driving spur, an advance surface depressed with relation to the plane occupied by a proper coin initially, and a trailing spur, said spur and tail centered upon the axis of oscillation.

11. In a coin controlled apparatus, oscillatory driving and driven elements, the former having a coin support, a driving spur adapted to engage a proper coin centrally, and an advance surface depressed with relation to the plane occupied by a proper coin initially.

12. In a coin controlled apparatus, oscillatory driving and driven elements, the former having a coin support, a driving spur, and an advance surface the latter interposed between said support and spur and depressed with relation to the plane occupied by a proper coin initially.

13. In a coin controlled apparatus, oscillatory driving and driven elements, the former having a radial coin support, a circumferential driving spur, and an advance surface the latter interposed between said support and spur and depressed with relation to the plane occupied by a proper coin initially.

14. In a coin controlled apparatus, the combination with a driving element having a coin support and a driving spur, of a driven element forming an abutment, means for interposing a proper coin between said spur and abutment, and means for oscillating said driving and driven elements whereby they are caused to radially approach and recede from each other during each delivery oscillation.

15. In a coin controlled apparatus, having oscillatory driving and driven elements constructed and arranged to be operatively connected by the interposition of a proper coin, independent shafts in fixed relation upon which said elements are mounted, means whereby said elements are caused to radially approach and recede from each other during each delivery oscillation, a rack fixed with relation to said driving element, a pawl engaging the rack to prevent premature retrograde movement of parts, and a spring for returning all parts to normal positions.

16. In a coin controlled apparatus, the combination with driving and driven elements, of means for operatively connecting said elements by the interposition of a proper coin comprising a coin receiving aperture, a yielding dog normally obstructing said aperture, and means for automatically locking said dog in its normal position when the supply of vendable goods becomes exhausted.

17. In a coin controlled apparatus, the combination with driving and driven elements, of means for operatively connecting said elements by the interposition of a proper coin said means comprising a coin receiving aperture, a yielding dog normally obstructing said aperture, a suitable stack for goods to be delivered, a follower for such goods in the stack, and means whereby said follower will engage the dog aforesaid to lock it in normal position when the supply of goods becomes exhausted.

In testimony whereof I affix my signature, in presence of two subscribing witnesses.

JAS. LEE SIMMONS.

Witnesses:
G. P. RITTER,
THOMAS DURANT.